(12) United States Patent
Kurien et al.

(10) Patent No.: US 6,778,943 B2
(45) Date of Patent: Aug. 17, 2004

(54) SYSTEMS AND METHODS FOR DISTRIBUTED FAULT DIAGNOSIS USING PRECOMPILED FINITE STATE AUTOMATA

(75) Inventors: James A. Kurien, Cupertino, CA (US); Xenofon Koutsoukos, Sunnyvale, CA (US); Rong Su, Toronto (CA)

(73) Assignee: Xerox Corporation, Stamford, CT (US)

( * ) Notice: Subject to any disclaimer, the term of this patent is extended or adjusted under 35 U.S.C. 154(b) by 73 days.

(21) Appl. No.: 10/217,028

(22) Filed: Aug. 13, 2002

(65) Prior Publication Data

US 2004/0034506 A1 Feb. 19, 2004

(51) Int. Cl.⁷ ............................................... G06F 11/30
(52) U.S. Cl. ..................................... 702/183; 709/106
(58) Field of Search ............................... 702/181–185, 702/187–189; 709/106–108, 220, 224; 710/15, 67; 717/154–159

(56) References Cited

U.S. PATENT DOCUMENTS

| | | | | |
|---|---|---|---|---|
| 4,964,075 A | * | 10/1990 | Shaver et al. | 710/67 |
| 5,163,016 A | * | 11/1992 | Har'El et al. | 716/5 |
| 5,684,807 A | | 11/1997 | Bianchini, Jr. et al. | 714/712 |
| 6,260,190 B1 | * | 7/2001 | Ju | 717/156 |
| 2003/0182354 A1 | * | 9/2003 | Scheidt et al. | 709/106 |

OTHER PUBLICATIONS

Debouk, R., et al., "Coordinated Decentralized Protocols for Failure Diagnosis of Discrete Event Systems," Department of Electrical Engineering and Computer Science, The University of Michigan, Revised Version Submitted to the Journal of Discrete Event Dynamical Systems: Theory and Applications, Mar. 29, 1999, pp. 1–40.

Sampath, M., et al., "Active Diagnosis of Discrete-Event Systems," IEEE Transactions on Automatic Control, vol. 43, No. 7, Jul. 1998, pp. 908–929.

de Kleer, Johan, et al., "Diagnosing Multiple Faults", (correction as of Mar. 22, 1992 of article Artificial Intelligence, 32, (1987) 97–130), pp. 100–117.

Reiter, Raymond, "A Theory of Diagnosis from First Principles," Artificial Intelligence 32, (1987) pp. 29–48.

Wonham, W.M., "Notes on Control of Discrete–Event Systems," Systems Control Group, Edward S. Rogers Sr. Dept. of Electrical & Computer Engineering, University of Toronto, ECE 1636F/1637S 2002–03, pp. 1–356, Jul. 2002 revision.

Su, R., et al., "Decentralized Fault Diagnosis for Discrete–Event Systems," Dept. of Electrical & Computer Engineering, University of Toronto, Jan. 28, 2001, 6 pages.

Kurien, James, et al., "Distributed Diagnosis of Networked, Embedded Systems," 36 pages, May 2, 2002, Workshop on Diagnosis.

* cited by examiner

Primary Examiner—Marc S. Hoff
Assistant Examiner—Mohamed Charioui
(74) Attorney, Agent, or Firm—Oliff & Berridge, PLC

(57) ABSTRACT

Most model-based diagnostic approaches are at least partially centralized. Routing information to or through a centralized processing unit is vulnerable to failure of the central processing unit and/or of the communication system connecting the central processing unit to the sensor or the local diagnostic subsystems. Centralized schemes also limit the amount of processing to that provided by the single centralized processing unit. The systems and methods according to this invention use local diagnostic subsystems that include finite state automata to model the possible states of local components given local sensor readings and potential inputs from other local diagnostic subsystems. Potential states are found during diagnosis of a local component, give one or more observations of that component. This state information is then distributed to other local diagnostic subsystems. Potential states are then found diagnosis of the local component, given state information provided concerning the states of other components.

12 Claims, 10 Drawing Sheets

$$(t_{round}, A_{i+1}, index_i)$$

SYSTEMS AND METHODS FOR DISTRIBUTED FAULT DIAGNOSIS USING PRECOMPILED FINITE STATE AUTOMATA

BACKGROUND OF THE INVENTION

1. Field of Invention

This invention is directed to the systems and methods for on-line distributed fault diagnosis of qualitative systems using precompiled finite state automata.

2. Description of Related Art

Finite state automata are used in a wide variety of technical fields, such as fault diagnosis, as a graphic representation for describing regular sequences of events or actions. For example, finite state automata are used to capture qualitative descriptions of the behavior of components of systems, as is often described in the literature, such as "Coordinated Decentralized Protocols for Failure Diagnosis of Discrete Event Systems", by R. Debouk et al., Discrete Event Dynamic Systems: Theory and Applications, 10(1/2): 33–86, January 2000, or "Active Diagnosis of Discrete-Event Systems", by M. Sampath et al., in Proc. 36$^{th}$ CDC, pages 2976–2983, San Diego, USA, December 1997.

Such finite state automata model the sequences of actions that are possible or allowable. One type of action or failure results in one set of possible states, while a different failure produces different states. When sensors are used to observe the resulting state, these observations are used to constrain the model to those actions that are consistent with the observations. Weighting or costs can be assigned to certain actions. Probability analysis can then be used on the finite state automata to determine which of the allowable states is most likely to occur.

SUMMARY OF THE INVENTION

Currently, most model-based diagnostic approaches are either purely centralized or partially centralized. Purely centralized approaches use a central diagnostic system that receives all information and that executes a diagnosis algorithm. In contrast, partly centralized approaches use a set of local diagnostic systems and a central coordinator that controls the information exchange among the local diagnostic systems. For a large system, routing information to or through a centralized processing unit is vulnerable to failure of the central processing unit and or of the communication system connecting the central processing unit to the sensors or the local diagnostic systems. In addition, centralized schemes limit the amount of processing to that provided by the single centralized processing unit. This limits the scalability of centralized diagnostic approaches in terms of the complexity of the physical system that can be diagnosed in a given period of time.

This invention provides systems and methods that perform distributed fault diagnosis.

This invention separately provides diagnostic systems and methods that include models of the physical system being diagnosed.

This invention separately provides systems and methods that utilize finite state automata to enable fast local diagnosis.

This invention separately provides systems and methods that implement local diagnostic analysis.

This invention separately provides systems and methods that provide communication between local diagnostic analyses over distributed networks.

This invention further provides systems and methods that construct local diagnoses and global diagnoses from the local diagnoses.

This invention separately provides systems and methods that apply probabilistic reasoning to determine a next optimal measurement position.

In various exemplary embodiments, the systems and methods according to this invention use finite state automata to model the possible states of local components given the local sensor readings and potential inputs from other components. In various exemplary embodiments, potential states are found during diagnosis of the local component, given one or more sensor observations made of any behavior. This state information is then distributed to other components. Potential states are then found during diagnosis of the local component, given state information provided concerning the states of other components. In various exemplary embodiments, probabilistic reasoning is used to determine when it is effective to use high cost sensor observations, communications and/or distributed diagnostic systems as part of the global diagnosis process.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
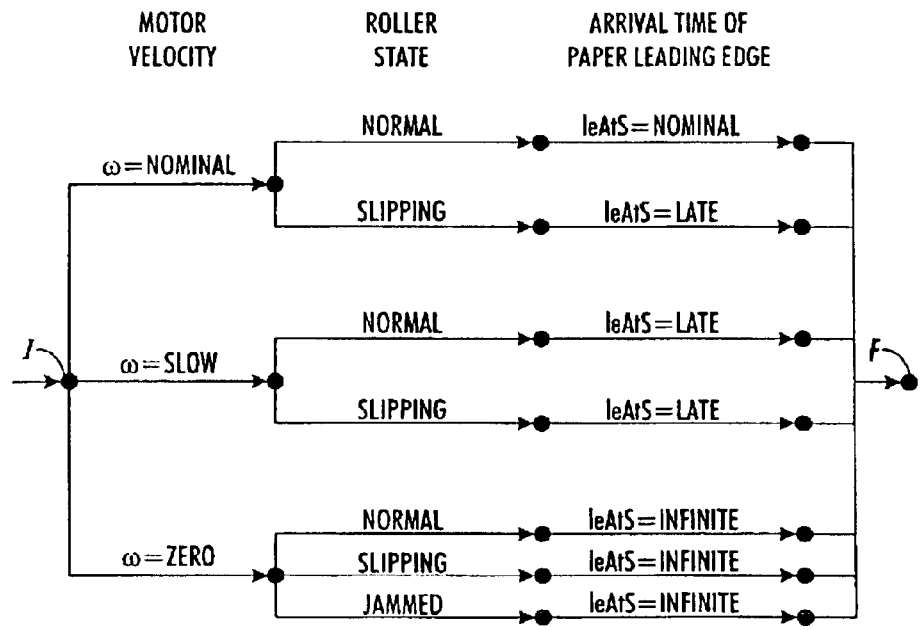
FIG. 1 illustrates one exemplary embodiment of a finite state automaton $A_t$ representing the a priori fault model of a component.

The systems and methods according to this invention implement a diagnostic technique using qualitative models. A qualitative model can include a set of logical constraints that form a qualitative (that is, non-numeric) description of a system's behavior. In various exemplary embodiments according to this invention, finite state automata are used to capture qualitative descriptions of the behavior of each component in a system, as is often done in the literature, such as, for example, "Coordinated Decentralized Protocols for Failure Diagnosis of Discrete Event Systems", by R. Debouk et al., Discrete Event Dynamic Systems: Theory and Applications, 10(1/2): 33–86, January 2000, or "Active Diagnosis of Discrete-Event Systems", by M. Sampath et al., in Proc. $36^{th}$ CDC, pages 2976–2983, San Diego, USA, December 1997.

In various exemplary embodiments of the systems and methods of this invention, finite state automata are used to represent the possible evolutions of a system being diagnosed with respect to observations and information exchanged between the subsystems of the system being diagnosed. In various exemplary embodiments of the systems and methods of this invention, tuples of values in, for example, a database, may be used to represent the possible evolutions of the system being diagnosed. In various exemplary embodiments of the systems and methods of this invention, one or more paths through a binary decision diagram or decision tree may be used to represent the possible evolutions of the system being diagnosed. In various exemplary embodiments, any scheme enabling the representation of all possible arrangements of one or more variables of a system being diagnosed as well as the determination of combinations of arrangements of the one or more variables, may be used.

A finite state automaton can be though of as capturing constraints represented by an initial state $State_1$, an action Action, and a next state $State_2$. If the finite state automaton is in the initial state $State_1$, then it is legal for the action $Action_1$ to occur. In addition, when the action $Action_1$ occurs, the finite state automaton will move to the next $State_2$, which accepts a potentially different set of actions. In a finite state automaton, a circle represents each state and each action is represented by a directed edge pointing from a beginning state to an end state. A finite state automaton is used to represent the consistent behaviors of each component in a complex physical system given the local sensor observations, if any, and the information or unobservable inputs from other components.

The systems and methods according to this invention implement a distributed diagnostic technique. Distributed components of a larger or global system each have a corresponding local diagnostic subsystem that maintains a corresponding diagnostic finite state automaton. Each local diagnostic subsystem applies observations from the corresponding sensors to its finite state automaton. This information is then passed to the local diagnostic subsystems of other distributed components so these other local diagnostic subsystems can update their finite state automata where appropriate. Communication continues until in this way until a global diagnosis is reached. U.S. patent application Ser. No. 10/217,026 incorporated herein by reference in its entirety, discloses one exemplary embodiment of a method for determining which local diagnostic subsystems should communicate with which other local diagnostic subsystems.

FIG. 1 illustrates one example of a finite state automaton $A_t$ which models a simple paper feed system. This simple paper feed system includes a motor, a roller and a sensor. The motor drives the roller at some velocity $\omega$ that is not directly observable. The roller pulls paper into the system from right to left. The leading edge of the paper triggers the sensor. That is, the sensor will report the "leading edge arrival time at sensor S", or "leAtS" in response to the arrival of the leading edge of the paper. The state of the motor can be normal, degraded or failed. The motor drive velocity $\omega$ when in these states can thus be nominal, slow or zero. This motor drive velocity $\omega$ is then fed to the roller. The state of the roller is also unobservable and can be normal, or slipping or jammed. Based on the state of the roller plus the state of the motor drive velocity $\omega$, the time t reported by the sensor will be nominal, late or infinite. An infinite value for the time t implies that the leading edge of the paper did not appear within the allowable time frame.

The finite state automaton $A_t$ shown in FIG. 1 describes all consistent or possible combinations of the values for the motor drive velocity $\omega$ fed from the motor to the roller, the state of the roller, and the arrival time of the leading edge of the paper, leAtS, observed at the sensor. Each path or evolution in the finite state automaton $A_t$ represents one possible consistent combination of these variables.

Figure 2:
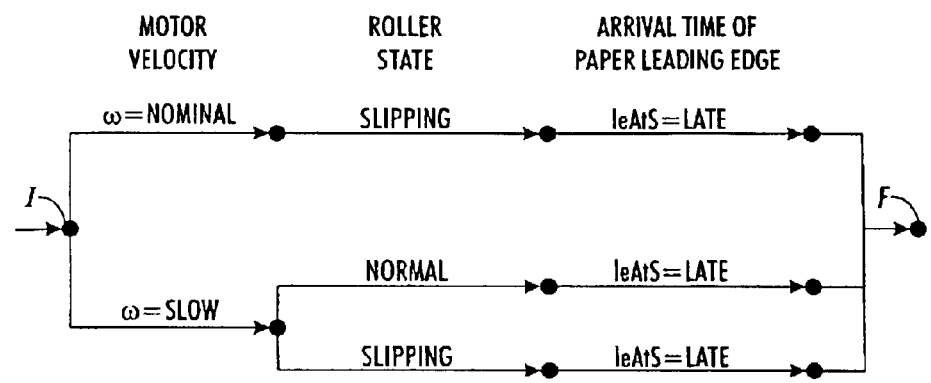
FIG. 2 illustrates one exemplary embodiment of a finite state automaton $\underline{A}_{t+1}$ representing a sub-language of the finite state automaton $A_t$ after observation constraints have been applied.

FIG. 2 illustrates one example of a finite state automaton $\underline{A}_{t+1}$ that is a sub-set or sub-language of the paths or evolutions in the finite state automaton $A_t$ shown in FIG. 1. The finite state automaton $\underline{A}_{t+1}$ shown in FIG. 2 is generated by applying an observation constraint for the time variable, t or leAtS, to the finite state automaton $A_t$ shown in FIG. 1. In this case, the leading edge of the paper arrived late at the sensor. The three constraint consistent evolutions, or paths, in which the value of the time variable t or leAtS is "late", of the finite state automaton $A_t$ shown in FIG. 1 are identified and included in the new finite state automaton $\underline{A}_{t+1}$ shown in FIG. 2.

Figures 3, 4:
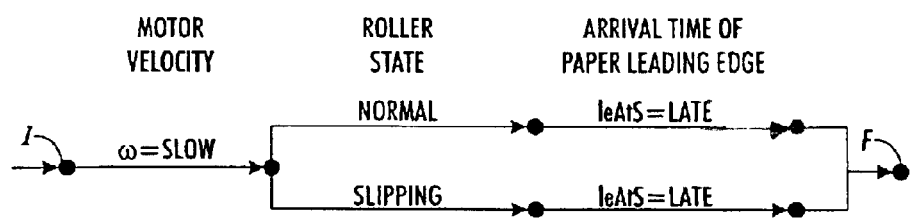
FIG. 3 illustrates one exemplary embodiment of a finite state automaton $A_{t+1}$ representing a sub-language of the finite state automaton $\underline{A}_{t+1}$ after information constraints have been applied.
FIG. 4 illustrates one exemplary embodiment of a format for communicating diagnostic information between distributed components.

FIG. 3 illustrates one example of a finite state automaton $A_{t+1}$ which is a sub-set or sub-language of the paths or evolutions in the finite state automaton $\underline{A}_{t+1}$ shown in FIG. 2. The finite state automaton $A_{t+1}$ shown in FIG. 3 is generated by applying an information constraint for the value of the motor drive velocity variable $\omega$ to the finite state automaton $\underline{A}_{t+1}$ shown in FIG. 2. The motor drive velocity variable $\omega$ is not directly observable at the local component, the roller. However, the information constraint that the value of the motor drive velocity variable $\omega$ is "slow", is received from a separate distributed component, the motor. The two constraint consistent evolutions, or paths, in which the value of the motor drive velocity variable $\omega$ is "slow", of the finite state automaton $\underline{A}_{t+1}$ shown in FIG. 2 are identified as the diagnosis and included in the new finite state automaton $A_{t+1}$ shown in FIG. 3.

FIG. 4 illustrates one exemplary embodiment of a communication format used to pass constraint information from the local diagnostic subsystem of one distributed component to the local diagnostic subsystem of another distributed component usable with the systems and methods according to this invention. The communication format shown in FIG. 4 contains the constraint information itself $A_{t+1}$, a start time $t_{round}$ of a specific round of diagnosis, and an index value. The start time $t_{round}$ is set when a change in behavior is first observed and the diagnosis process begins. In various exemplary embodiments, the start time $t_{round}$ is used by the local diagnostic subsystems of other distributed components so that the local diagnostic subsystems of those other distributed components know when to terminate the diagnosis process. In various exemplary embodiments, the index is usable by some types of communication networks to identify if additional information or constraints have been applied to a message since the last time the local diagnostic subsystem of a given distributed component received that message. It should be appreciated that, in various embodiments of the invention, the entire sub-language $A_{t+1}$ need not be sent to the local diagnostic subsystems of other distributed components. Rather, in these exemplary embodiments, only the information necessary to communicate the constraint information is required.

Figure 5:
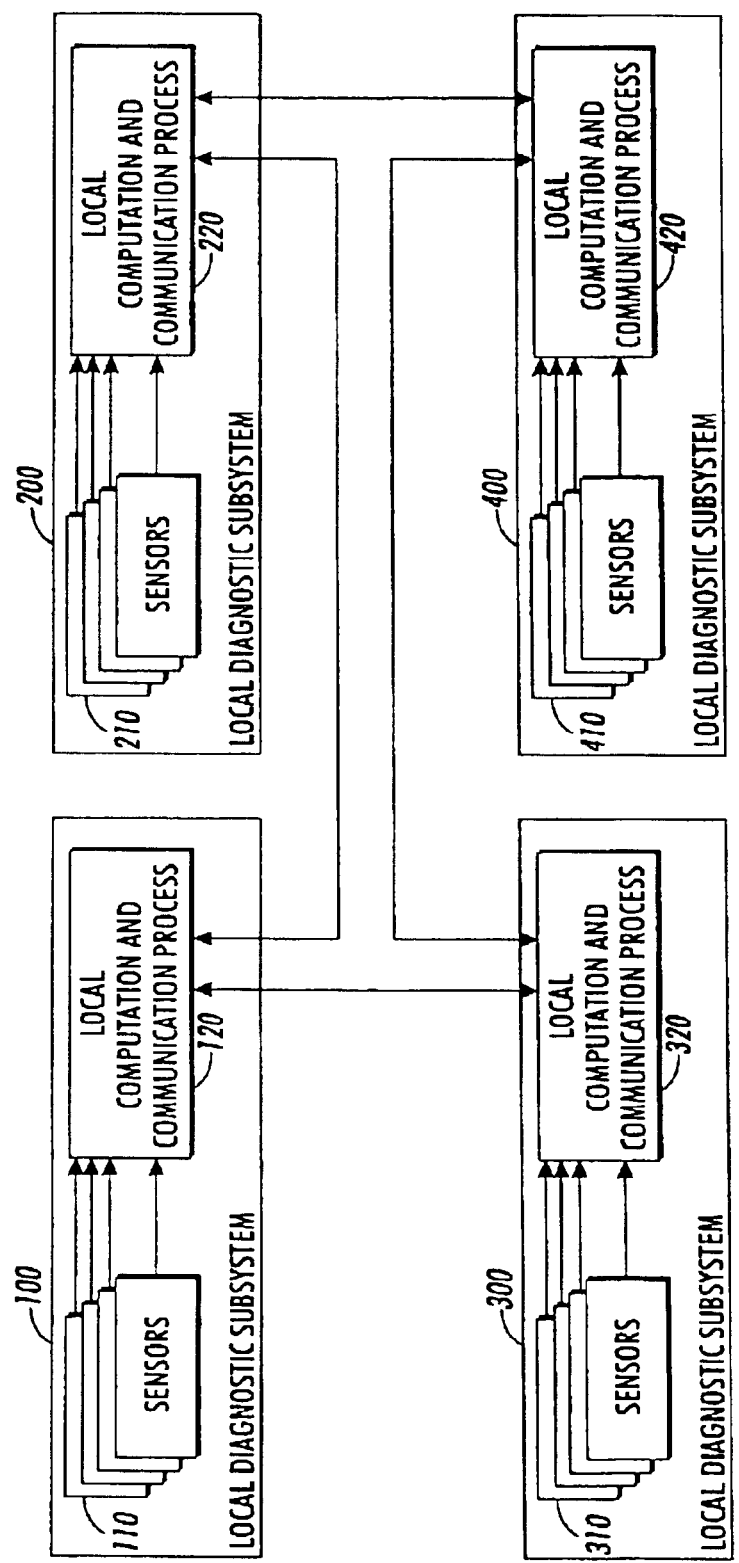
FIG. 5 is a data flow diagram outlining a first exemplary embodiment of the flow of data during distributed fault diagnosis using precompiled finite state automata.

FIG. 5 is a data flow diagram outlining one exemplary embodiment of the flow of data during distributed fault diagnosis using precompiled finite state automata. As shown in FIG. 5, distributed fault diagnosis begins when one or more of a number of local sensors 110, 210, 310 or 410, within, or at least connected to, corresponding local diagnostic subsystems 100–400, observe one or more changes in system behavior. Each sensor 110, 210, 310 or 410 outputs sensor data to the local computation and communication process 120, 220, 320 or 420, respectively of the local diagnostic subsystems 100–400. Each local computation and communication process 120, 220, 320 or 420 includes a finite state automaton, such as that shown in FIG. 1, that models the system component corresponding to the local diagnostic subsystems 100–400 and that system component's interaction with other ones of the system components of the system being diagnosed. Each local computation and communication process 120, 220, 320 or 420 applies the sensor observations as constraints to the corresponding finite state automaton to produce a sub-language, such as that shown in FIG. 2.

The sub-language that is generated by one of the local computation and communication processes 120, 220, 320 or 420 is sent to other one or more of the local diagnostic subsystems 100–400 in a message format, such as that shown in FIG. 4. The set of diagnostic subsystems that each local computation and communication process 120, 220, 320 or 420 sends this message to are predetermined to provide an efficient transfer of information with a reduced amount of communication.

The sub-language generated for each local diagnostic subsystem 100–400 is received by one or more of the local diagnostic subsystems 100–400 and provided to the corresponding local computation and communication process 120, 220, 320 or 420. The information constraints contained in the received sub-language are applied by the local computation and communication process 120, 220, 320 or 420 to the current state of the corresponding finite state automaton representing the fault model of the component corresponding to the local diagnostic subsystem 100–400 containing that local computation and communication process 120, 220, 320 or 420. The evolutions of the current state of the corresponding finite state automaton of that local diagnostic subsystem 100–400 that are consistent with the original fault model, previous constraints and the latest information constraints are identified.

Each of the local computation and communication process 120, 220, 320 or 420 again determines which of the other local diagnostic subsystems 100–400 to send the new constraint information to. If the local computation and communication process 120, 220, 320 or 420 determines not to send the new constraint information to any of the other local diagnostic subsystems 100–400, the local computation and communication process 120, 220, 320 or 420 waits for messages from any one of the other local diagnostic subsystems 100–400 until a period $2T_{MAX}$ for the current round of diagnosis expires. After the period $2T_{MAX}$ has expired, the current diagnosis operation ends and the local computation and communication processes 120, 220, 320 or 420 of the local diagnostic subsystems 100–400 are reset to wait for new observations to start the process again.

Figure 6:
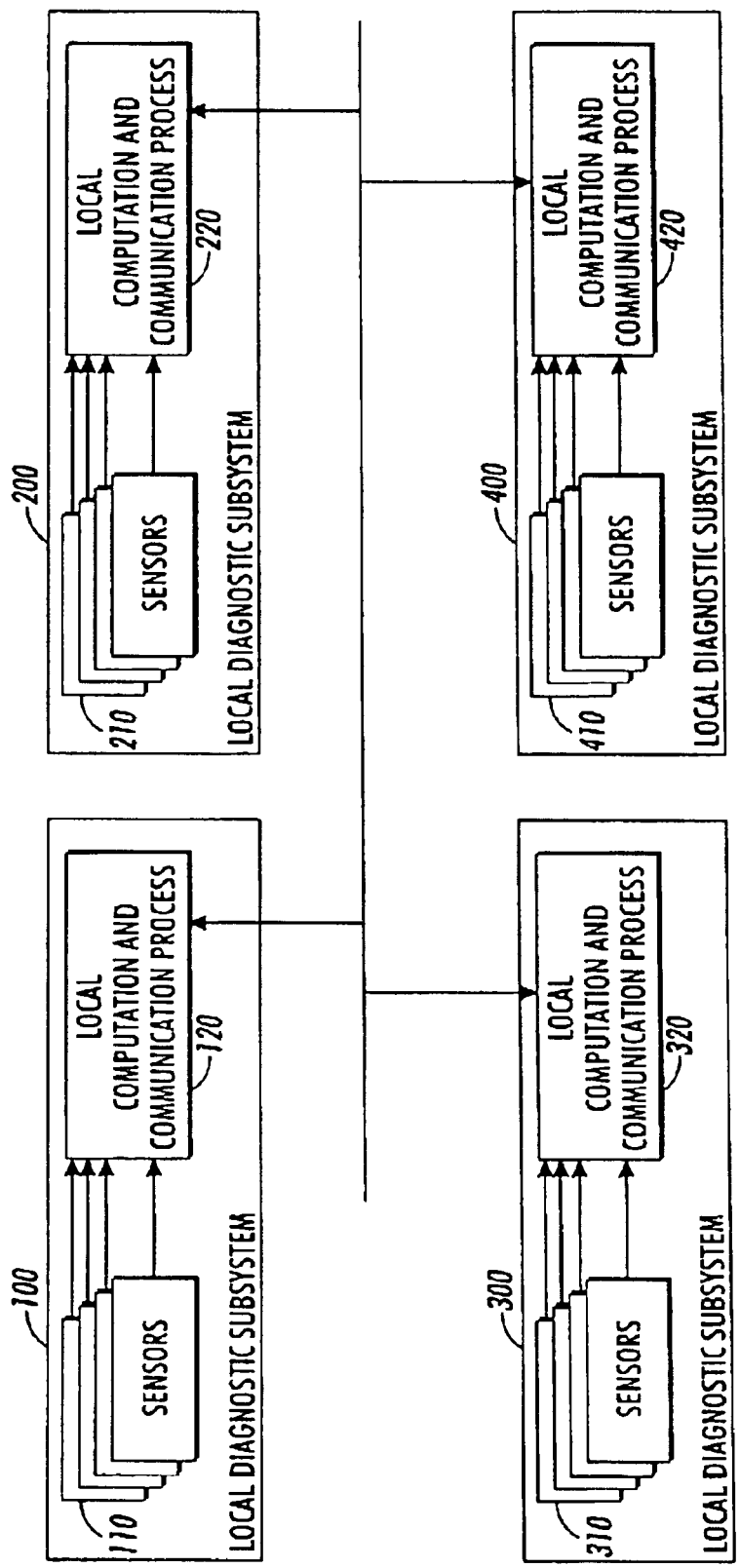
FIG. 6 is a data flow diagram outlining a second exemplary embodiment of the flow of data, over a network providing economical broadcast communication, during distributed fault diagnosis using precompiled finite state automata.

FIG. 6 is a data flow diagram outlining a second exemplary embodiment of the flow of data, over a network providing economical broadcast communication, during distributed fault diagnosis using precompiled finite state automata. As shown in FIG. 6, distributed fault diagnosis begins when one or more local sensors 110, 210, 310 or 410, within, or at least connected to, corresponding local diagnostic subsystems 100–400 observe one or more changes in system behavior. Each sensor 110, 210, 310 or 410 may output sensor data to the local computation and communication process 120, 220, 320 or 420 respectively. Each local computation and communication process 120, 220, 320 or 420 includes a finite state automaton, such as that shown in FIG. 1, that models a system component that corresponds to the local diagnostic subsystems 100–400 and the interaction of that system component with other system components that correspond to the local diagnostic subsystems 100–400. Each local computation and communication process 120, 220, 320 or 420 applies the sensor observations as constraints to the corresponding finite state automaton to produce a sub-language such as that shown in FIG. 2.

The sub-language that is generated by one of the local computation and communication processes 120, 220, 320 or 420 is sent to all the other local diagnostic subsystems 100–400 in a message format, such as that shown in FIG. 5. The sub-language generated for each local diagnostic subsystems 100–400 is received by other ones of the local diagnostic subsystems 100–400 and provided to the local computation and communication processes 120, 220, 320 and 420. The information constraints contained in the received sub-language are applied by the local computation and communication processes 520, 620, 720 and 820 to the current finite state automata representing the fault model of the components of the receiving local diagnostic subsystems 100–400. The evolutions of the current finite state automaton of each receiving local diagnostic subsystem 100–400 that are consistent with the original fault model, previous constraints and the latest information constraints are identified.

If the current finite state automaton is changed or updated by the local computation and communication process 120, 220, 320 or 420, this new constraint information is again broadcast to all of the other local diagnostic subsystems 100–400. If one of the local computation and communication processes 120, 220, 320 or 420 determines not to send the new constraint information to the other distributed local diagnostic subsystems 100–400, that local computation and communication process 120, 220, 320 or 420 waits for messages from any one or more of the other local diagnostic subsystems 100–400 until the period $2T_{MAX}$ for the current round of diagnosis expires, where $T_{MAX}$ is the maximum amount of time required for information to propagate across the diagnostic network. After the period $2T_{MAX}$ has expired, the current diagnosis operation ends and the local computation and communication processes 120, 220, 320 or 420 are reset to wait for new observations to start the process again.

Figure 7:
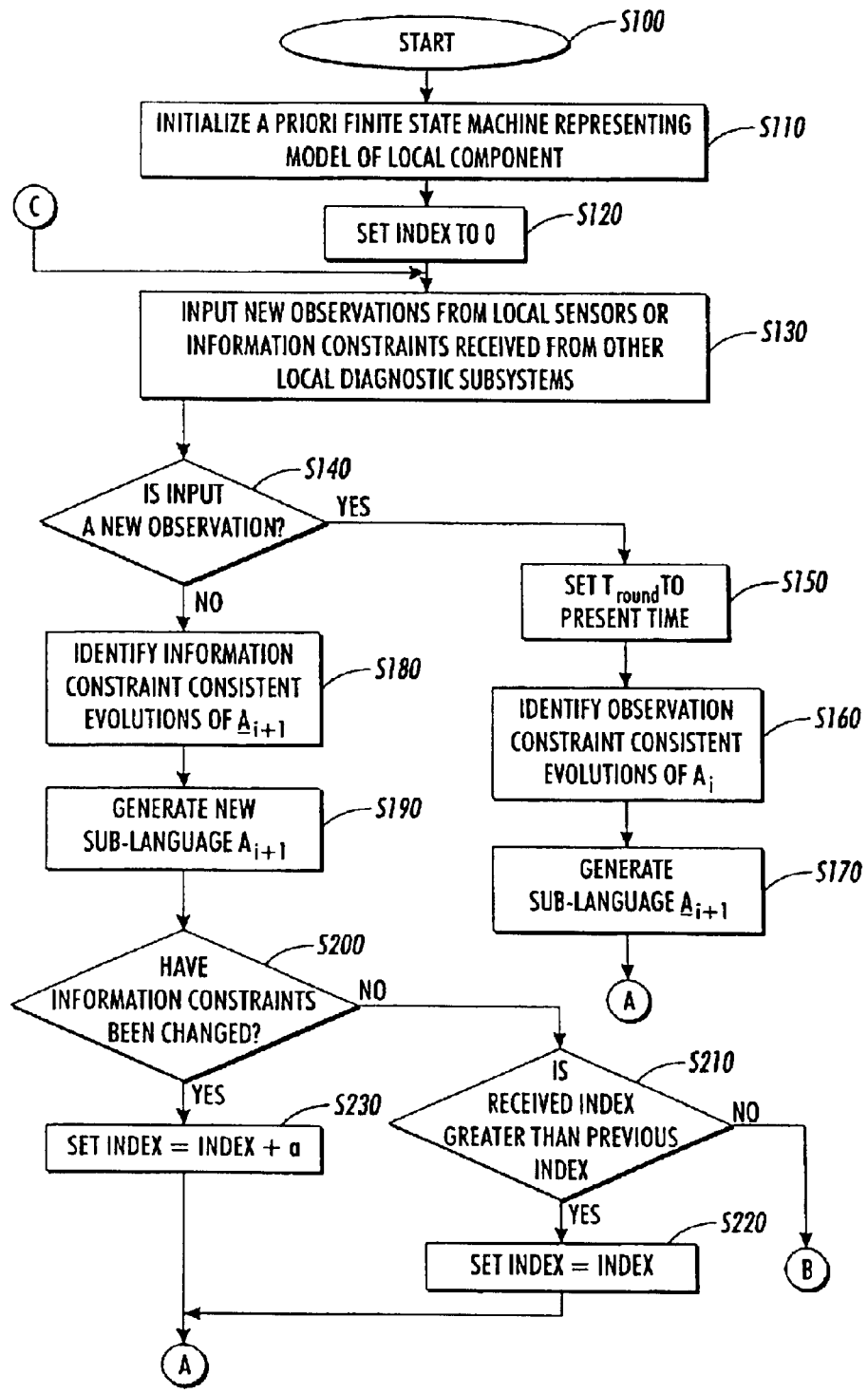
FIGS. 7 and 8 are a flowchart outlining a first exemplary embodiment of a method for generating a global diagnosis by first locally computing constraint consistent evolutions of a finite state automaton $A_t$ that models the fault conditions of a local component.
Figure 8:
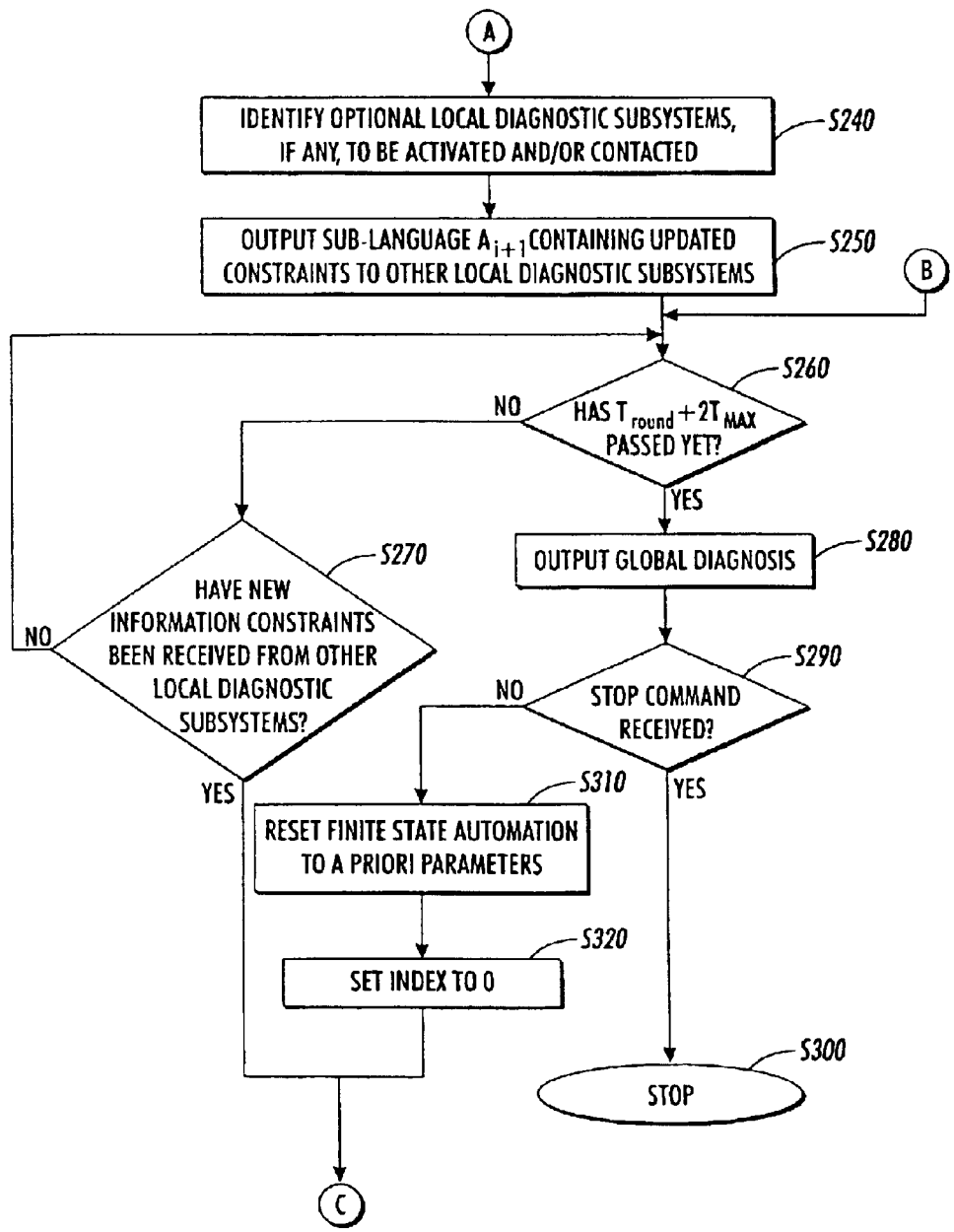

FIGS. 7 and 8 are a flowchart outlining a first exemplary embodiment of a method for generating a global diagnosis by first locally computing constraint consistent evolutions of a finite state automaton $A_1$ that models the fault conditions of a local component. As shown in FIGS. 7 and 8, operation of the method begins in step S100, and continues to step S110, where an a priori finite state automaton $A_i$ representing the fault model for the local component, such as that shown in FIG. 1, is initialized. Then, in step S120, the message index is set to zero. Next, in step S130, a new observation is received from local sensors or a new information constraint is received from another local diagnostic subsystem. Operation continues to step S140.

In step S140, a determination is made whether the received constraint is a new observation or is information regarding a distributed component. If it is a new observation, operation continues to step S150. Otherwise, operation jumps to step S180. In step S150, the message format parameter $T_{round}$ is set to the current time. Then, in step S160, the observed value of the variable received from the sensor is compared to the value of the observation variable in each path or evolution of the finite state automaton $A_i$. All paths or evolutions where the value received from the sensor matches the value of the observation variable in the path or evolution are labeled constraint consistent evolutions. Next, in step S170, a finite state automaton or sub-language $\underline{A}_{i+1}$ such as that shown in FIG. 2, is generated by keeping all of the constraint consistent evolutions identified in the finite-state automaton $A_1$, and discarding the rest. Operation then jumps to step S240.

In contrast, in step S180, the value of the received information constraint value is compared to the value of the information constraint variable in each path or evolution of the finite state automaton $\underline{A}_{i+1}$. All paths or evolutions where the value of the received information variable from other ones of the local diagnostic subsystems matches the value of the information variable in the path or evolution are labeled constraint consistent evolutions. Next, in step S190, a finite state automaton or sub-language $A_{i+1}$, such as that shown in FIG. 3, is generated by keeping all of the constraint consistent evolutions identified in the finite-state automaton $\underline{A}_{i+1}$, and discarding the rest. Then, in step S200, a determination is made whether the constraint information contained in the sub-language generated in step S190 is changed or updated from the last constraint information that was received from another local diagnostic subsystem. If not, operation continues to step S210. Otherwise, operation jumps to step S230.

In step S210, a determination is made whether the index of the received constraint information is greater than the index of the previous constraint information. If the index of the received constraint information is greater, operation continues to step S220. Otherwise, operation jumps to step S260. It should be appreciated that any one or more known or later developed methods for determining if constraint consistent evolutions have new effective content can be used. In step S220, the index for any constraint information to be output to other local diagnostic subsystems is set to the index of the received constraint information. Operation then jumps directly to step S240. In contrast, in step 230, the index of the constraint information to be sent is set to the index of the received constraint information plus the index increment a, which is typically one. Operation then continues to step S240.

In step S240, any optional ones of the other local diagnostic subsystems, if any, that are to be contacted in addition to any default ones of the local diagnostic subsystems to be contacted are identified. Then, in step S250, the message containing $T_{round}$, the updated information constraints $A_{i+1}$, and the index is sent to the ones of the local diagnostic subsystems identified in step S240. Next, in step S260, a determination is made whether the current time has reached $T_{round}$ plus $2T_{max}$. If the current time has reached $T_{round}$ plus $2T_{max}$, operation jumps to step S280. Otherwise, operation continues to step S270.

In step 270, a determination is made whether new information constraints have been received since the current finite state automaton was last updated with new constraints. If new information constraints have been received, operation returns to step S130. Otherwise, operation returns to step S260. In contrast, in step S280, the global diagnosis is output. Next, in step S290, a determination is made whether a command input directs the method to stop. If so, operation jumps to step S300. Otherwise, operation continues to step S310. In step S310, the finite state automaton $A_i$ is reset to the a priori parameters of that finite state automaton. Next, in step S320, the index is reset to zero. Operation then again returns to step S130. In contrast, in step S300, operation of the method ends.

Figure 9:
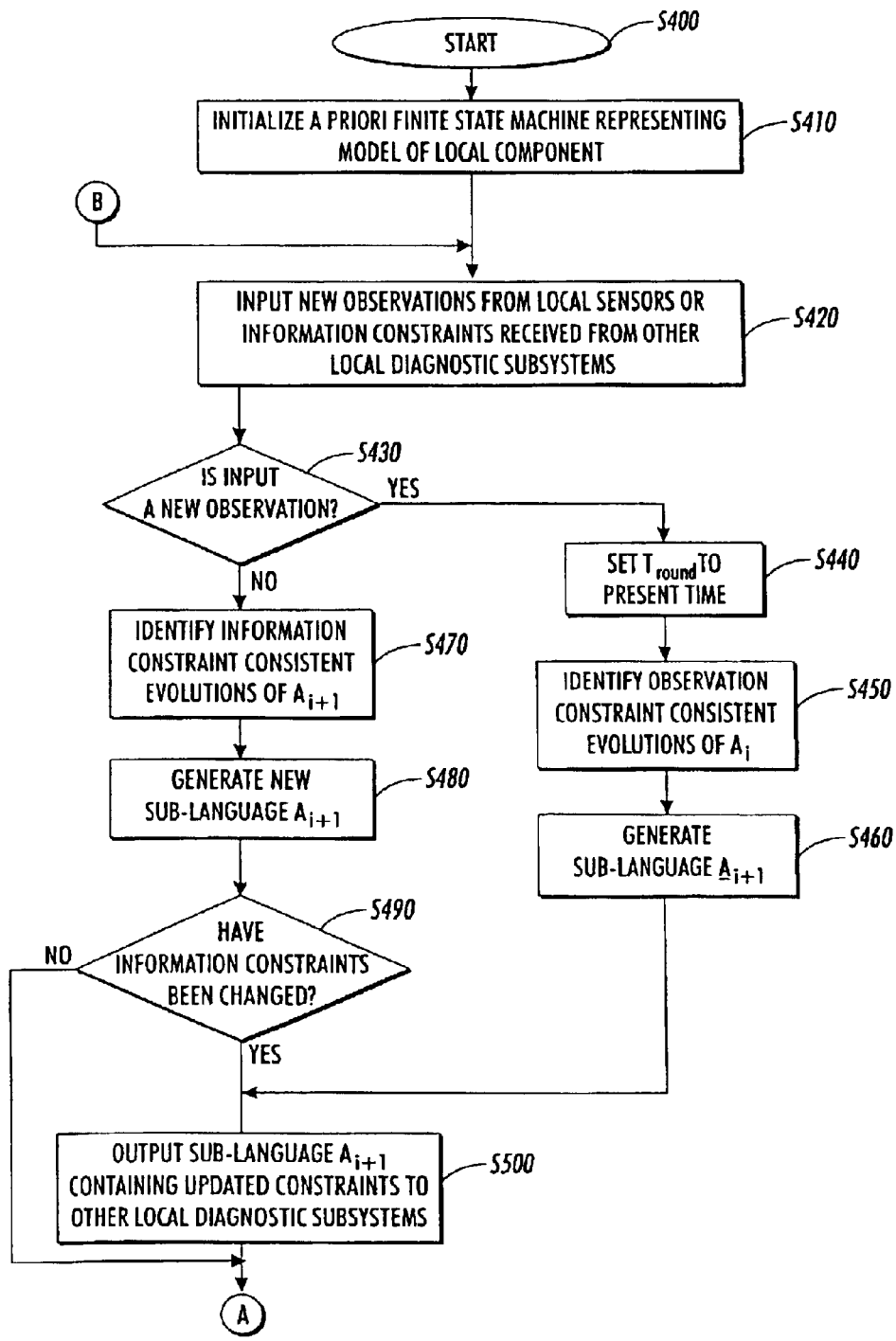
FIGS. 9 and 10 are a flowchart outlining a second exemplary embodiment of a method for generating a global diagnosis by first locally computing constraint consistent evolutions of a finite state automaton $A_t$ that models the fault conditions of a local component.
Figure 10:
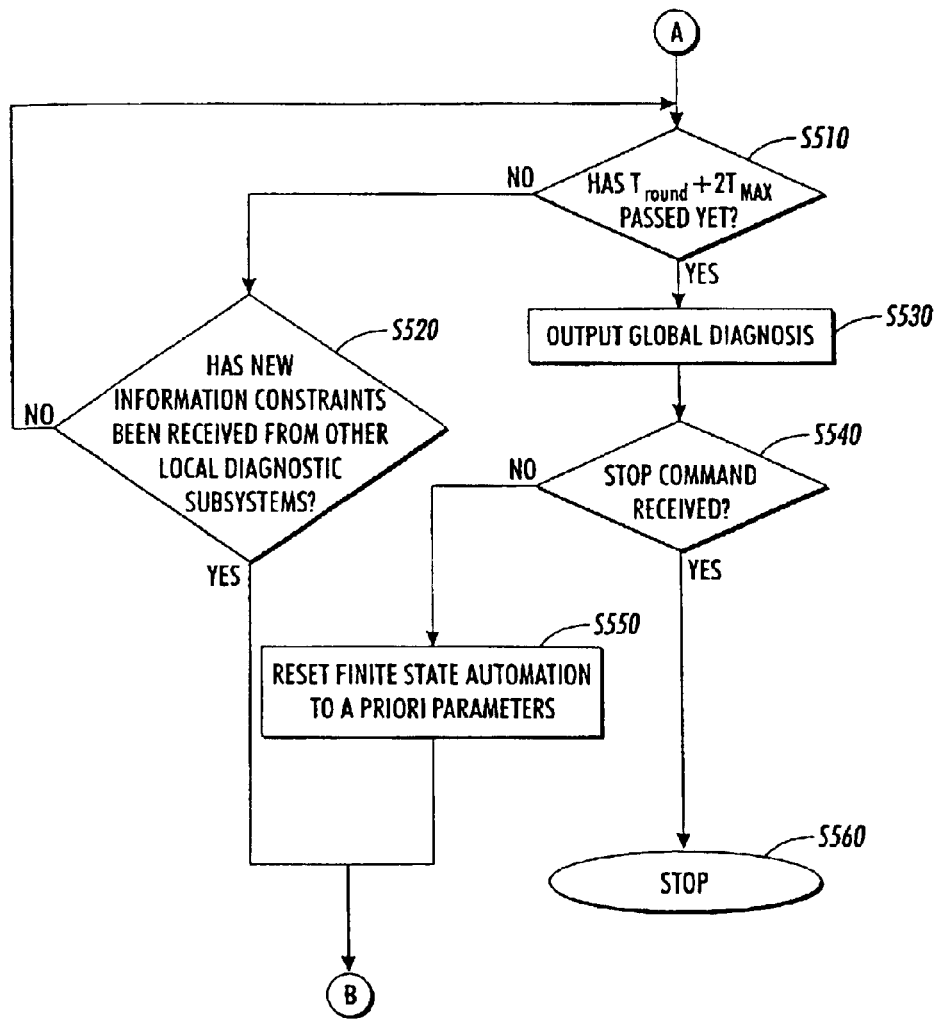

FIGS. 9 and 10 are a flowchart outlining a second exemplary embodiment of a method for generating a global diagnosis by first locally computing constraint consistent evolutions of a finite state automaton $A_i$ that models the fault conditions of a local component.

As shown in FIGS. 9 and 10, operation of the method begins in step S400, and continues to step S410, where an a priori finite state automaton $A_i$ representing the fault model for the local component, such as that shown in FIG. 1, is initialized. Then, in step S420, a new observation received from local sensors or a new information constraint received from another one of the local diagnostic subsystems is input. Next, in step S430, a determination is made whether the received constraint is a new observation or is information from a distributed component. If it is a new observation, operation continues to step S440. Otherwise, operation jumps to step S470.

In step S440, the message format parameter $T_{round}$ is set to the current time. Then, in step S450, the observed value of the variable received from the sensor is compared to the value of the observation variable in each path or evolution of the finite state automaton $A_i$. All paths or evolutions where the value received from the sensor matches the value of the observation variable in the path or evolution are labeled constraint consistent evolutions. Next, in step S460, a finite state automaton or sub-language $\underline{A}_{i+1}$, such as that shown in FIG. 2, is generated by keeping all of the constraint consistent evolutions identified in $A_i$, and discarding the rest. Operation then jumps to step S500.

In contrast, in step S470, the value of the received information constraint value is compared to the value of the information constraint variable in each path or evolution of the finite state automaton $\underline{A}_{i+1}$. All paths or evolutions where the value of the information variable received from the other one of the local diagnostic subsystem matches the value of the information variable in the path or evolution are labeled constraint consistent evolutions. Next, in step S480, a finite state automaton or sub-language $A_{i+1}$, such as that shown in FIG. 3, is generated by keeping all of the constraint consistent evolutions identified in $\underline{A}_{i+1}$, and discarding the rest. Then, in step S490, a determination is made whether, the constraint information contained in the sub-language generated in step S480 is changed or updated from the last constraint information that was received from another one of the local diagnostic subsystems. If not, operation jumps directly to step S510. Otherwise, operation continues to step S500.

In step S500, the message containing $T_{round}$, and the updated information constraints $A_{i+1}$, is broadcast to all the other distributed components. Then, in step S510, a determination is made whether the current time has reached $T_{round}$ plus $2T_{max}$. If the current time has reached $T_{round}$ plus $2T_{max}$, operation jumps to step S530. Otherwise, operation continues to step S520.

In step S520, a determination is made whether new information constraints have been received since the current finite state automaton was last updated with new constraints. If new information constraints have been received, operation returns to step S420. Otherwise, operation returns to step S510. In contrast, in step S530, the global diagnosis is output. Next, in step S540, a determination is made whether the command input directs the method to stop. If so, operation jumps to step S560. Otherwise, operation continues to step S550. In step S550, the finite state automation $A_i$ is reset to the a priori parameters for that local diagnostic subsystem. Operation then returns to step S420. In contrast, in step S560, operation of the method ends.

Figure 11:
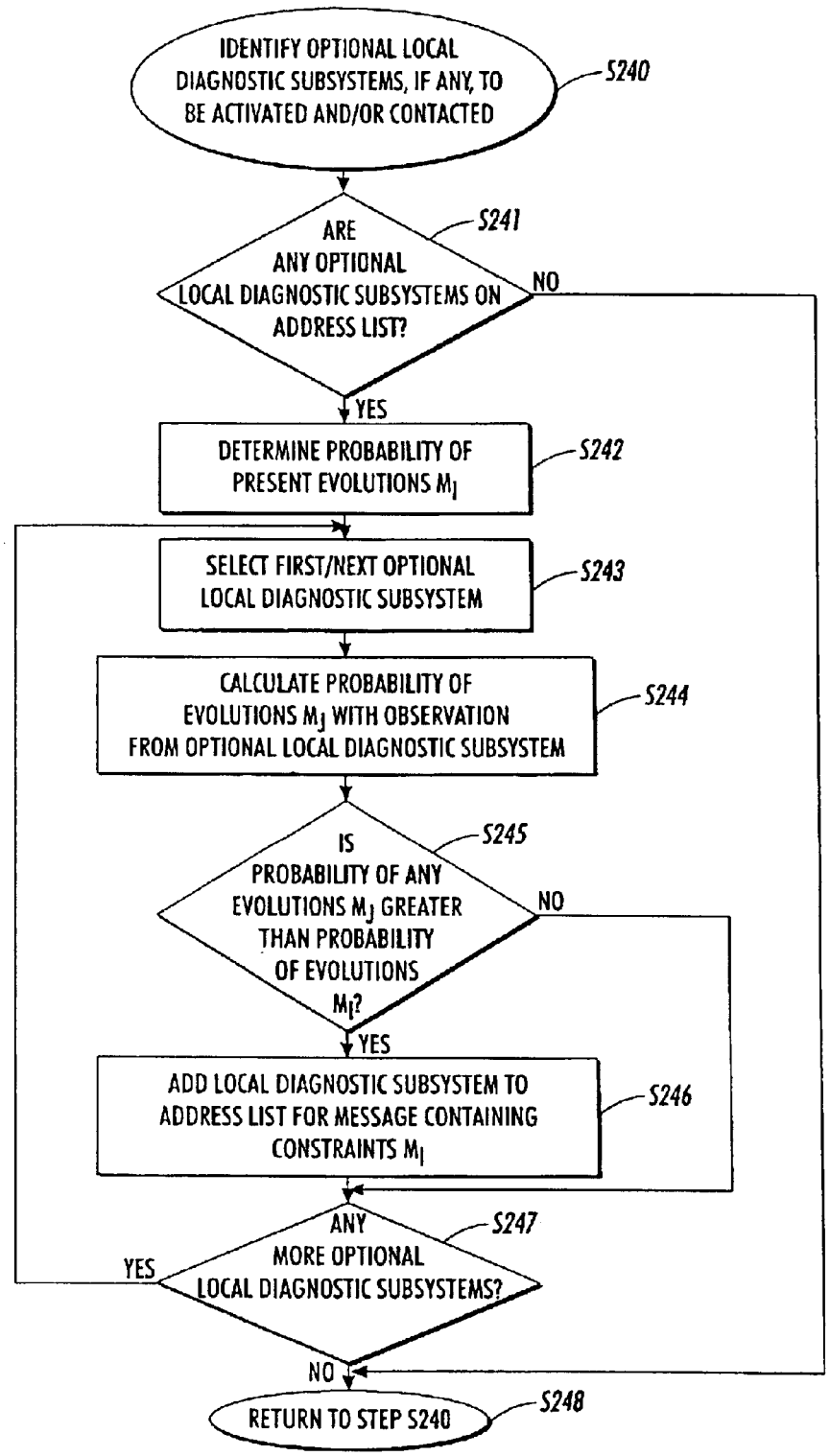
FIG. 11 is a flowchart outlining in greater detail one exemplary embodiment of a method for determining when it is optimal to communicate with optional components over a network according to this invention.

FIG. 11 is a flowchart outlining in greater detail one exemplary embodiment of a method for identifying any optional components to be contacted of FIG. 7. As shown in FIG. 11, operation of the method begins in step S240 and continues to step S241, where a determination is made whether there are any optional local diagnostic subsystems on the local component address list. If there are optional local diagnostic subsystems, operation continues to step S242. Otherwise, operation jumps to step S248.

In step S242, a probability of each constraint consistent evolution occurring based on the current observations is determined. Next, in step S243, the first or next optional local diagnostic subsystem is selected. Then, in step S244, the probability of the evolutions assuming each possible outcome of the variable observed by the optional local diagnostic subsystems is determined. Next in step S245, a determination is made whether, for the selected optional local diagnostic subsystems and any of the constraint consistent evolutions, the probability based on any of the possible outcomes determined in step S244 is greater than the probability based on present observations determined in step S242. If so, operation continues to step S246. Otherwise, operation jumps to step S247.

In step S246, the optional local diagnostic subsystems is added to the address list Next, in step S247, a determination is made whether there are any more optional local diagnostic subsystems to check. If there are more optional local diagnostic subsystems to check, operation returns to step S243. Otherwise, operation continues to step S248, where operation returns to step S250.

Figure 12:
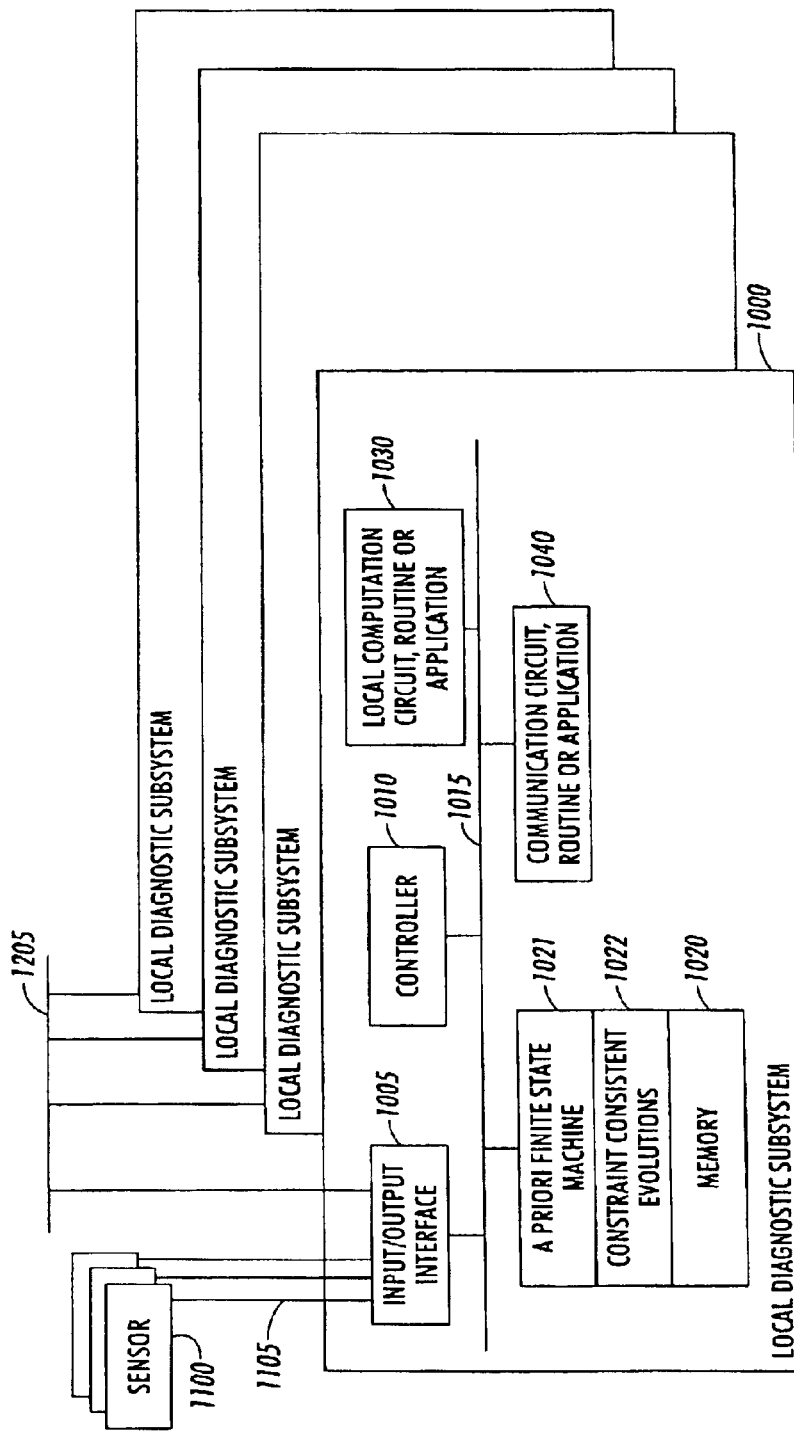
FIG. 12 is a block diagram of one exemplary embodiment of a distributed diagnostic system according to this invention.

FIG. 12 shows one exemplary embodiment of a local diagnostic subsystem 1000 according to this invention. As shown in FIG. 12, the local diagnostic subsystem 1000 includes an input/output interface 1005, a controller 1010, a memory 1020, a local computation circuit, routine or application 1030, a communication circuit, routine or application 1040, each interconnected by one or more control/data busses and/or application programming interface 1015.

As shown in FIG. 12, one or more sensors 1100, and other local diagnostic subsystems 1000 are connected to the local diagnostic subsystem 1000 by the links 1105 and 1205 respectively.

In general, each of the one or more sensors 1100 shown in FIG. 12 can be any one of a number of different sensors. In general, each of the one or more sensors 1100 can be any known or later developed sensor that is capable of detecting a physical state and providing an analog or digital signal identifying that state to the local diagnostic subsystem 1000. It should be appreciated that the one or more sensors 1100 of FIG. 12 do not need to be the same type of device.

The one or more sensors 1100 can be integrated into the local component being diagnosed, such as in a battery charger with a built in voltage sensor. Additionally or alternatively, the local diagnostic subsystem 1000 may be integrated with devices providing additional functions in addition to the one or more sensors 1100, in a larger system for which the local diagnostic subsystem 1000 is providing fault diagnosis.

Each of the links 1105 and 1205 connecting the one or more sensors 1100 and other local diagnostic subsystems 1000, respectively to the local diagnostic subsystem 1000, can be any known or later developed connection device, such as a direct cable connection, a modem, a local area network, a wide area network, a storage area network, an intranet, an extranet, the Internet, any other distributed processing network, or any other known or later developed connection device. It should be appreciated that any of these connections may include wired and/or wireless portions. In general, each of the links 1105 and 1205 can be of any known or later-developed connection system or structure usable to connect the respective devices to the local diagnostic subsystem 1000. It should be understood that the links 1105 and 1205 do not need to be of the same type.

As shown in FIG. 12, the memory 1020 can be implemented using any appropriate combination of alterable, volatile, or non-volatile memory or non-alterable, or fixed memory. The alterable memory, whether volatile or non-volatile can be implemented using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

Various exemplary embodiments of the local diagnostic subsystem 1000 can be implemented as software executing on a programmed general purpose computer, a special purpose computer, a microprocessor or the like. Various other exemplary embodiments of the local diagnostic subsystem 1000 can be implemented as a routine embedded in a library, or a resource residing on a server, or the like. Various exemplary embodiments of the local diagnostic subsystem 1000 can be also be implemented by physically incorporating that device into a software and/or hardware system, such as a digital scanner, or a copier. It should be understood that each of the various exemplary embodiments of the local diagnostic subsystem 1000 do not need to be implemented the same way.

It should also be understood that each of the circuits, routines, applications or managers shown in FIG. 12 can be implemented as portions of a suitably programmed general-purpose computer. Alternatively, each of the circuits, routines, applications or managers shown in FIG. 12 can be implemented as physically distinct hardware circuits within an ASIC, using a digital signal processor (DSP), using a FPGA, a PLD, a PLA and/or a PAL, or using discrete logic elements or discrete circuit elements. The particular form of the circuits, routines, applications or managers shown in FIG. 12 will take is a design choice and will be obvious and predictable to those skilled in the art. It should be appreciated that the circuits, routines or managers shown in FIG. 12 do not need to be of the same design.

When operating the local diagnostic subsystem 1000, the physical state of the component is observed by the one or more sensors 1100 and the observations are input over the link 1105. The input/output interface 1005 inputs the observations and under the control of the controller 1010, forwards them to the local computation circuit, routine or application 1030.

The local computation circuit, routine or application 1030 then retrieves the a priori finite state automaton from an a priori finite state automaton portion 1021 of the memory 1020 under control of the controller 1010, and identifies which paths or evolutions in the priori finite state automaton are consistent with the observation constraints received from the one or more sensors 1100. The identified constraint consistent evolutions are then stored in a constraint consistent portion 1022 of the memory 1020 under the control of the controller 1010.

The communication circuit, routine or application 1040 then retrieves the constraint consistent evolutions from the constraint consistent evolutions portion 1022 of the memory 1020 under control of the controller 1010 and distributes the retrieved constraint consistent evolutions to other local diagnostic subsystems 1000. The communication circuit, routine or application 1040 also selects the other local diagnostic subsystems 1000 to which the retrieved constraint consistent evolutions are to be distributed to. The designated local diagnostic subsystems are chosen from a list of default and optional local diagnostic subsystems 1000. A probability analysis can be performed to determine whether to include any of the optional local diagnostic subsystems 1000. It should be appreciated that any one or more known or later developed methods for determining this probability can be used. The selected constraint consistent evolutions are then sent over the link 1205 to the designated local diagnostic subsystems.

The communication circuit, routine or application 1040 in another local diagnostic subsystem 1000 then receives the distributed constraint consistent evolutions over the link 1205. The information constraints in the received constraint consistent evolutions are then provided to the local computation circuit, routine or application 1040 of the receiving local diagnostic subsystem 1000 under the control of the controller 1010.

The local computation circuit, routine or application 1030 of the receiving local diagnostic subsystem 1000 then retrieves the constraint consistent evolutions from the constraint consistent evolutions portion 1022 of the memory 1020 under control of the controller 1010 and identifies which paths or evolutions in the constraint consistent evolutions are consistent with the information constraints received in the distributed constraint consistent evolutions. The new identified constraint consistent evolutions are then stored in the constraint consistent portion 1022 of the memory 1020 under the control of the controller 1010.

The communication circuit, routine or application 1040 then again retrieves the constraint consistent evolutions from the constraint-consistent-evolutions portion 1022 of the memory 1020 under control of the controller 1010 and determines if continued communication is necessary. The decision to continue communication is based on whether the updated constraint consistent evolutions have new information not in previous received constraint consistent evolutions. An index is incremented every time a local computation circuit, routine or application 1040 modifies a finite state automaton with a new constraint. When no new constraints are applied, the index of incoming constraint consistent evolutions will have the same or lower value than a previous index and the latest constraint information will not be sent to other local diagnostic subsystems 1000. It should be appreciated that any one or more known or later developed methods for determining if constraint consistent evolutions have new effective content can be used.

If the constraint consistent evolutions are to be sent, the communication circuit, routine or application 1040 again selects the distributed components the constraint consistent evolutions are to be sent to and the constraint consistent evolutions are sent over the link 1205 to the designated local diagnostic subsystems 1000 under the control of the controller 1010. The communication circuit, routine or application 1040 of the other local diagnostic subsystems 1000 will receive and process the received constraint consistent evolutions as previously described. The communication circuit, routine or application 1040 will continue to receive and process constraint consistent evolutions until a default time period $2T_{MAX}$ from the first observation occurs. When $2T_{MAX}$ occurs, the communication circuit, routine or application 1040 will output the constraint consistent evolutions as a global diagnosis.

What is claimed is:

1. A method for determining a global diagnosis of a system that has a plurality of components, each component having an associated local diagnostic subsystem that includes a finite-state automaton that represents that component, the method comprising:

initializing the finite state automata representing the components;

inputting at least one of the local diagnostic subsystems, at least one of a new observation from a sensor associated with the component associated with that local diagnostic subsystem or at least one information constraint received by that local diagnostic subsystem from another local diagnostic subsystem;

determining a set of evolutions of the finite state automaton that are consistent with the received at least one of the new observation or the received at least one information constraint;

outputting the set of evolutions to at least one other one of the plurality of local diagnostic subsystems; and outputting the set of evolutions from at least one of the plurality of local diagnostic subsystems as the global diagnosis.

2. The method of claim 1, wherein:

inputting at least one of the local diagnostic subsystems, at least one of a new observation from a sensor associated with the component associated with that local diagnostic subsystem or at least one information constraint received by that local diagnostic subsystem from another local diagnostic subsystem comprises determining if a new observation from a sensor associated with the component associated with that local diagnostic subsystem was input;

if a new observation was input, determining a set of evolutions comprising determining the set of evolutions of the finite state automaton that are consistent with the new observation.

3. The method of claim 2, further comprising generating a new sub-language based on the determined observation consistent evolutions.

4. The method of claim 3, wherein outputting the set of evolutions to at least one other one of the plurality of local diagnostic subsystems comprises outputting the new sub language to the at least one other one of the plurality of local diagnostic subsystems.

5. The method of claim 1, wherein:

inputting at least one of the local diagnostic subsystems, at least one of a new observation from a sensor associated with the component associated with that local diagnostic subsystem or at least one information constraint received by that local diagnostic subsystem from another local diagnostic subsystem comprises determining if at least one information constraint received by that local diagnostic subsystem from another local diagnostic subsystem was input;

if at least one information constraint received by that local diagnostic subsystem from another local diagnostic subsystem was input, determining a set of evolutions comprising determining the set of evolutions of the finite state automaton that are consistent with the at least one information constraint received by that local diagnostic subsystem from another local diagnostic subsystem.

6. The method of claim 5, further comprising generating a new sub-language based on the determined information constraint consistent evolutions.

7. The method of claim 6, wherein outputting the set of evolutions to at least one other one of the plurality of local diagnostic subsystems comprises outputting the new sub language to the at least one other one of the plurality of local diagnostic subsystems.

8. The method of claim 1, further comprising waiting a predetermined period of time after one of the plurality of local diagnostic subsystems receives at least one information constraint from at least one other local diagnostic subsystem before outputting the global diagnosis.

9. The method of claim 8, further comprising:

determining, for at least one of the plurality of local diagnostic subsystems, whether that local diagnostic subsystem has received at least one information constraint from at least one other local diagnostic subsystem within the predetermined time; and if that local diagnostic subsystem has received at least one information constraint from at least one other local diagnostic subsystem within the predetermined time, resetting the predetermined time to be measured from about the time that that local diagnostic subsystem received at least one information constraint from at least one other local diagnostic subsystem.

10. A method for using a local diagnostic subsystem to determine a local diagnosis of a component of a system, the local diagnostic subsystem including a finite state automaton representing the component, the method comprising:

initializing the finite state automaton representing the component;

inputting at least one of a new observation from a sensor associated with the component or at least one information constraint received from another local diagnostic subsystem;

determining a set of evolutions of the finite state automaton that are consistent with the received at least one of the new observation or the received at least one information constraint; and determining a local diagnosis of the component based on the set of evolutions.

11. The method of claim 10, further comprising outputting the set of evolutions to at least one other local diagnostic subsystem, each other local diagnostic subsystem including a finite state automaton representing an other component of the system.

12. The method of claim 11, further comprising determining a set of the at least one other local diagnostic subsystem to which the set of evolutions is to be output.

* * * * *